United States Patent [19]
Leger et al.

[11] Patent Number: 5,597,955
[45] Date of Patent: Jan. 28, 1997

[54] VIBRATING BEAM GYROSCOPIC MEASURING APPARATUS

[75] Inventors: Pierre Leger, Issy-les-Moulineaux; Olivier Marchais, Paris; Francis Bienaime, Taverny, all of France

[73] Assignee: Societe D'Applications Generales D'Electricite et de Mecanique Sagem, Paris Cedex, France

[21] Appl. No.: 583,942

[22] Filed: Jan. 11, 1996

Related U.S. Application Data

[63] Continuation of Ser. No. 75,110, Jun. 11, 1993, abandoned.

[30] Foreign Application Priority Data

Jun. 11, 1992 [FR] France .................................. 92 07032
May 10, 1993 [FR] France .................................. 93 05578

[51] Int. Cl.$^6$ ............................................... G01P 15/14
[52] U.S. Cl. ......................................... 73/504.16; 310/333
[58] Field of Search ............................. 310/333, 321, 310/329; 338/2, 5; 73/504.16, 504.15, 504.14, 504.12, 504.04

[56] References Cited

U.S. PATENT DOCUMENTS 3,127,775  4/1964  Hansen et al. .............................. 73/505
5,166,571  11/1992  Konno ....................................... 73/505

FOREIGN PATENT DOCUMENTS 0309963  4/1989  European Pat. Off. .
0318972  6/1989  European Pat. Off. .
442280  8/1991  European Pat. Off. .

OTHER PUBLICATIONS

Japanese Journal of Applied Physics, Proc. 11th Symp. on Ultrasonic Electronics vol. 30, No. 30–1, 1991, Yokohama, pp. 129–131 XP305670.
Sugawara et al "Equivalent circuit and construction of piezoelectric vibratory gyroscopes using a flexurally–vibrating resonator with a square cross section", p. 129, col. 2, l. 1–l. 9; FIGS. 1, 2, 5.

Primary Examiner—Christine K. Oda
Attorney, Agent, or Firm—Larson and Taylor

[57] ABSTRACT

A rate gyro or a gyroscope includes a resonator having four mutually parallel identical beams integral with a common square base and projecting from the base at corners of a virtual square. The beams have a same resonant frequency in two directions parallel to the two sides of the square base. It further has first transducers for vibrating each beam in a first direction orthogonal to the beams, connected to a driving circuit and second transducers for detecting an amplitude of vibration of the beams in a second direction each orthogonal to a respective first direction.

22 Claims, 7 Drawing Sheets

VIBRATING BEAM GYROSCOPIC MEASURING APPARATUS

This application is a continuation of application Ser. No. 08/075,110 filed Jun. 11, 1993, now abandoned.

BACKGROUND OF THE INVENTION

The present invention relates to vibrating beam gyroscopic apparatus that use the Coriolis acceleration which acts on a vibrating body when the latter rotates and is directed orthogonally to the rotational velocity and to the direction of vibration. It is particularly suitable for use as a rate gyro but may also be arranged for delivering a signal representative of an angle of rotation rather than of a rate of turn.

Numerous vibrating beam rate gyros have already been proposed. For example, a vibrating gyro having a H shaped resonator is described in EP-A-0 309 963. That gyro has four metal beams which carry driving piezo-electric elements for vibrating the beams in a first direction and sensing piezoelectric elements for measuring vibrations in a second direction, orthogonal to the first. Since the four beams make up the branches of an H-shape, the gyro can be secured via the junction between the two tuning forks constituted in this way since the junction which forms the cross bar of the H-shape constitutes a vibration node.

That disposition suffers from drawbacks. A twisting couple appears between the two tuning forks when the gyro is subjected to rotary motion. It is mechanically not convenient to support the vibrating unit by means of the cross bar of the H-shape. In practice it is not possible to give each tine or beam a cross-section that is square and is constant along its entire length and thus to obtain the same resonant frequency of vibration in the detection direction (output direction) as in the direction of the vibration caused by the driving elements (input direction).

Another rate gyro having a plurality of tines rectangularly shaped to provide for different frequencies in the input direction and in the output direction is described in U.S. Pat. No. 3,127,775.

SUMMARY OF THE INVENTION

The invention has for an object to provide an improved vibrating beam gyroscopic measuring apparatus. It is a particular object to provide an apparatus which is simple and compact in structure, and is easily fixed at a vibration node.

To this end, there is provided a gyrometric measuring apparatus having:
- a resonator comprising four mutually parallel identical beams integral with a common square base and projecting from said base at corners of a virtual square, said beams being constructed to have a same resonant frequency in two directions parallel to the two sides of said square,
- first transducers for vibrating each of said beams in a first direction orthogonal to said beams, connected to a driving circuit, and
- second transducers for detecting an amplitude of vibration of said beams in second directions each orthogonal to a respective said first direction.

The beams will typically be of constant cross-section along their entire length. However, it is also possible to provide local flaring or tapering, e.g. at the ends. This makes it possible, for example, to adjust the resonant frequency. As a general rule, each beam will have a cross-section giving it the same moment of inertia in two mutually orthogonal directions. A square cross-section will often be used.

The beams do not vibrate independently of one another. The mechanical coupling via the base is sufficient for vibration imparted to one of the beams to cause the others to vibrate. Nevertheless, it is advantageous to provide driving transducers on several of the beams.

The base-beam unit may be machined in a metal whose resiliency varies little with temperature, such as the alloy known under the name "Elinvar".

In a first embodiment of the invention, the first transducers and the driving circuit are arranged to vibrate all beams in mutually parallel directions (input or driving mode). Then the input mode and the output mode are topologically identical if all beams are identical, have a same square cross-section and are arranged at the four angles of a square. The resonant frequencies $f_E$ of the input mode and $f_s$ of the output mode are inherently equal.

In such an arrangement, the input and output modes are much less coupled than in prior art devices. However, coupling may still be reduced if the first transducers and the driving circuit are arranged for vibrating two said beams in a direction orthogonal to the direction of oscillation of the other two beams in the input mode.

In a second embodiment, the driving circuit is arranged for generating an input mode which may be qualified as "even" and vibrates the beams radially (or tangentially) while the output mode is tangential (or radial).

In a third embodiment, the input mode may be "mixed" and results from a linear combination of the "even" modes.

Typically the transducers are piezo-electric elements. They may consist of thin plates of metal-plated ceramic, e.g. of $ZrO_3$-Pb Ti ceramic bonded to the beams. They can be polarized for avoiding the provision of inverters and/or subtracting units in the circuits. Anyway, they are carried by the beams and decrease the Q-factor of the resonator. It is another object of the invention to overcome that drawback. For that purpose, the transducers may be electrostatic and comprise stationary elements which constitute capacitors with conductive beams. For instance the elements may be located in slots which separate the beams.

Since electro-static transducers are not linear, they will typically be used for high quality apparatus which require a high Q-factor. On the other hand, piezo-electric transducers will be used for low level applications which can tolerate a reduced Q factor and a time drift.

The apparatus may be used as a gyroscope for measuring amounts of rotation rather than as a rate gyro. For that purpose, the apparatus again comprises a resonator as hereinbefore defined. It further comprises first transducers for vibrating each of said beams in a first direction orthogonal to said beams, connected to a first circuit, and second transducers for vibrating each of said beams in a second direction orthogonal to a respective said first direction and connected to a second circuit; the first circuit and second circuit are arranged to deliver energization (signals to said first and second transducers compensating for losses and for measuring trigonometrical functions and an angle between a vectorial sum of the forces resulting from said signal and a reference direction.

When the apparatus is used as a gyroscope, the associated circuits continuously compensate for the energy losses of the two modes of vibration.

The dimensions of the beams are selected to as to obtain a resonant frequency commensurate with the rotary speeds to be measured. For speed rotations that do not exceed 100°/s, it is possible to make a rate gyro whose length does not exceed 50 mm and whose cross-sectional area may be less than 20 mm by 20 mm. Assembling is very simple since a base is available that constitutes a vibration node. All forces and possible torques mutually compensate within the base. The gyro is thus relatively insensitive to external vibrations.

The invention will be better understood from the following description of particular embodiments given by way of examples. The description refers to the accompanying drawings.

DETAILED DESCRIPTION OF EMBODIMENTS

Figure 1:
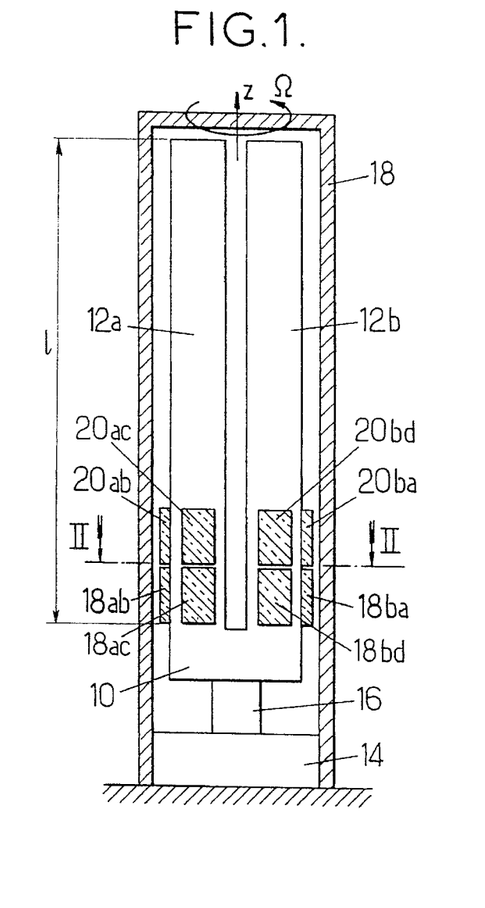
FIG. 1 is an elevation view of the vibrating or structural portion of a rate gyro constituting an embodiment of the invention.

FIG. 1 shows the general structure of a resonator for a vibrating beam rate gyro suitable for implementing the invention. The resonator may be considered as comprising a square section base 10 that is integral with four vibrating beams 12a, 12b, 12c and 12d. As explained below, the base constitutes a vibration node. It may be secured to a stand 14 via a rod 16. A cover or housing 18 may be fixed to the stand 14 so as to define a sealed or gas-tight enclosure, which may be evacuated to increase the structural Q-factor of the resonator.

Figure 2:
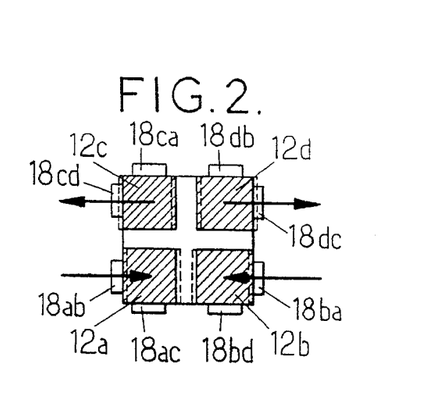
FIGS. 2 and 3 are views in cross-section on line II—II of FIG. 1, for showing respectively the direction of movement as caused the driving elements and by Coriolis forces during a rotation Ω about the axis of the resonator, when the circuits are for operation in "odd" modes.
Figure 3:
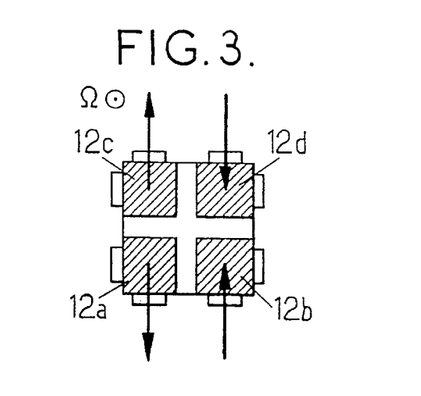

In the embodiment shown in FIGS. 2–3, the beams may be considered as constituting two tuning forks put into vibration in phase opposition, operating in "odd" modes.

It would be difficult to make the entire resonator out of piezo-electric material. Consequently, it is preferably to machine it from a block of metal having good mechanical qualities and whose elasticity varies little with temperature. Under such circumstances, vibration may be caused by piezo-electric elements fixed to some or all beams and the vibrations caused by Coriolis forces are detected, likewise, by piezo-electric elements fixed to the beams. These elements are generally in the form of rectangular pellets that are metal coated on one of their faces, the other face being bonded to a beam that constitutes an electrical ground. Some of the piezo-electric elements are driving elements and are connected to an excitation or driving circuit that provides the energy required for vibrating the beams and for compensating losses. The other elements are connected to a detection circuit for detecting vibration caused by Coriolis forces.

The excitation circuit will generally be a closed loop circuit so as to give the driving vibration a constant amplitude and an angular frequency equal to the resonant frequency of the resonator, while this is not strictly essential. The detection circuit may be an open circuit or a closed loop circuit.

The minimum number of piezo-electric elements depends on the nature of the driving circuit and of the detection circuit. In practice, at least eight elements are required. In the example shown in FIGS. 1 to 3, all elements are placed on outside faces of the beams, thereby making it possible to leave narrow slots only between the beams, having a width just sufficient to avoid hindering vibration. The eight elements are given references 18ab to 18db in FIG. 2.

When such a resonator is operated in open loop mode, i.e. when measuring the vibration amplitude y due to the Coriolis acceleration on beams subjected to vibration of amplitude x, the rate of turn or rotational velocity Ω about the axis z of the resonator is given by the following equation:

$$y = 2 \times Q \Omega / \omega$$

where ω is the angular frequency at resonance (which is the same in driving mode and in detection mode since the beams are square) and where Q is the quality factor of the resonator, which depends on the material from which it is made.

Figure 4:
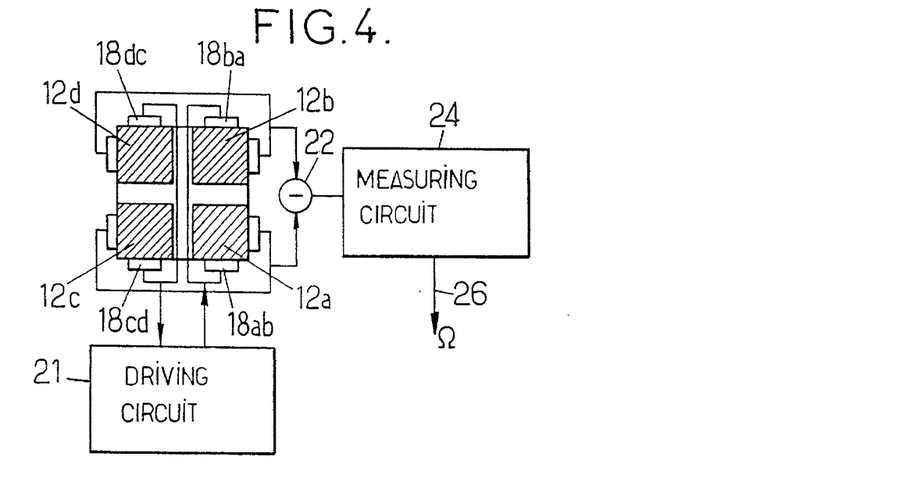
FIG. 4 is a block diagram of open loop excitation and measuring circuits for a gyro according to FIGS. 1–3.

Operation with an open loop measurement can be obtained with an excitation or driving circuit and a detection circuit associated with the piezo-electric elements as shown in FIG. 4. The excitation circuit 21 is connected to a pair of piezo-electric elements, e.g. 18ab and 18ba, directly causing one of the tuning forks to resonate and causing the other to resonate by coupling. The amplitude of vibration of the beams is measured by a second pair of piezo-electric elements, e.g. elements 18cd and 18dc, placed at the same level along z but on the other tuning fork.

The circuit 21 may be arranged in various way, typically as described below, and it enables the vibration amplitude x to be kept constant, which vibration takes place in the direction of the arrows in FIG. 2 and in the opposite direction.

As shown in FIG. 4, open loop detection is differential. The output signals delivered by the two pairs of piezoelectric elements are applied to the two inputs of a subtractor 22 whose output is applied to a demodulator or rectifier circuit 24 whose output 26 is representative of angular velocity Ω. The pairs of measuring piezo-electric elements are chosen so as to take account of phase opposition in vibratory motion, as indicated by the arrows of FIG. 3 for an half cycle.

The pass band of an open loop rate gyro is equal to ω/4πQ. When it is desired to increase this pass band, a closed loop measurement circuit can be used which keeps the vibration amplitude due to the Coriolis forces to a zero value. Under such circumstances, the gain and the pass band are much more in dependence of the quality of the servo-control than of the quality factor of the mechanical resonator. Closed loop operation requires a larger number of piezo-electric elements. In the example shown in FIG. 1, eight additional piezo-electric elements 20ab, . . . , 20dc are distributed in a ring or circumferential row, directly above elements 18ab, . . . , 18dc. Two superposed elements are given the same indices in FIG. 5 which shows a possible configuration of an excitation circuit with phase and amplitude servo-control and a possible arrangement of a closed loop measurement circuit. It is suitable for use when the gyro has sixteen piezo-electric elements; however a number of elements other than sixteen is possible.

Figure 5:
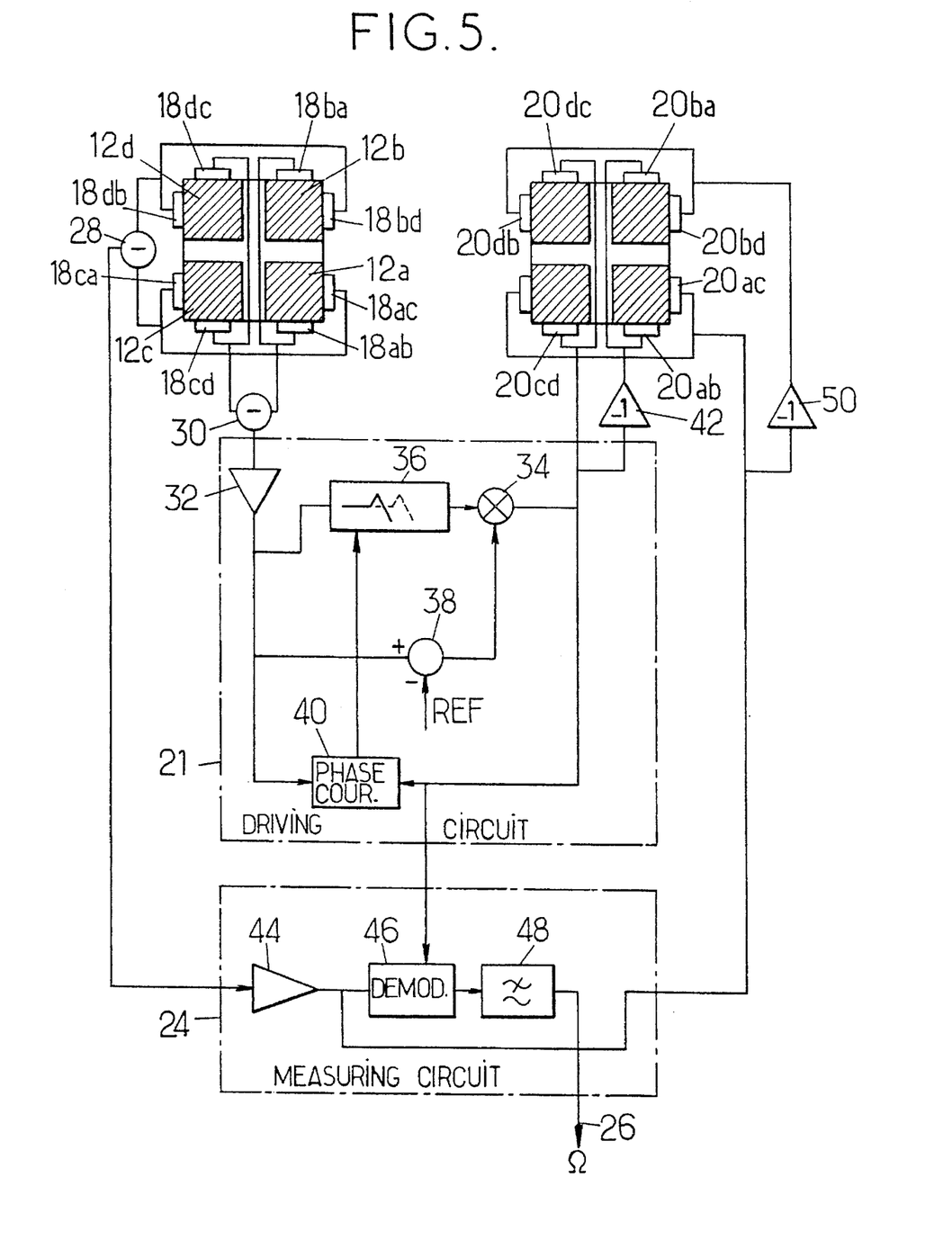
FIG. 5 is a block diagram of closed loop excitation and measuring circuit for a rate gyro as shown in FIG. 1.

The excitation circuit shown in FIG. 5 differs from that of FIG. 4 in that the input signal of the circuit is obtained from four piezo-electric elements each carried by one of the beams (instead of two) and the output signal thereof is applied to four elements (instead of two).

The four piezo-electric elements 18ab, 18ba, 18cd and 18dc provide output signals each in direct relation with the amount of movement of the respective beam and these signals are combined in a subtractor 30 to provide the input signal to the excitation circuit 21 which is phase and amplitude servo controlled. The circuit shown by way of example comprises an amplifier 32 which feeds a multiplier 34 via a filter 26 driven by a phase regulation system. The gain of attenuating multiplier 34 is controlled by an amplitude regulation system 38 which receives both the output signal from the amplifier 32 and a reference signal REF representing the amplitude to be maintained.

The filter 36 (generally an active filter) is controlled by a phase comparator 40 which receives the output signal of amplifier 32 and also the output signal from the whole circuit, derived from multiplier 34, and it controls the filter to maintain the phase shift at a constant value which is generally zero.

The output signal of circuit 21 is fed directly to piezo-electric elements 20cd and 20dc, and via an inverter 42 to piezo-electric elements 20ba and 20ab. As mentioned above, it would be sufficient to energize two elements only.

The four piezo-electric elements 18db, 18bd, 18ca and 18ac provide signals which are combined in a subtractor 28 to constitute the input signal of a closed loop measurement circuit 24.

The circuit 24 may be conventional in structure. The circuit as shown comprises an input amplifier 44 followed by a synchronous demodulator 46 which receives a reference signal constituted by the output signal of circuit 21. The demodulated signal is applied to a low-pass filter 48 whose output 26 is representative of the angular speed Ω. The loop is closed by a connection between the output of amplifier 44 and the piezo-electric elements 20ac, . . . , 20b. An inverter 50 inverts the polarity of the signal applied to the elements 20bd and 20db. It is possible to omit the subtractors 28 to 30 and the inverters 42 and 50 by appropriately directing the polarization vectors of the piezo-electric pellets relative to one another, as will be shown later.

As an example, the following characteristics can be those of a rate gyro designed to measure a rate of turn up to 100° per second. The mechanical resonator comprises four beams each having a cross-section of 6 mm by 6 mm, and each 30–35 mm long. The piezo-electric elements are constituted by pellets of PZT having a thickness of a few tenths of a millimeter, metal-coated on both faces, and bonded to the beams.

Figure 6:
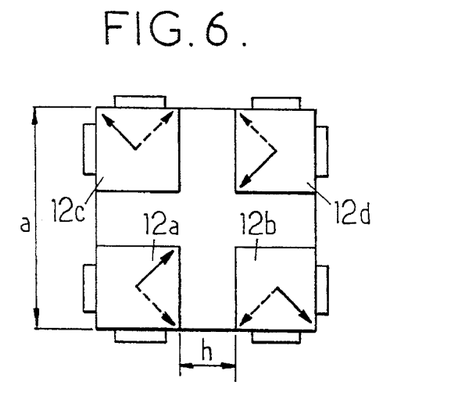
FIGS. 6 and 7 are cross-sections along line II—II of FIG. 1, showing the direction of movement in input mode (full lines) and output mode (dot lines), respectively in "even" modes and "mixed" modes.

Turning now to FIG. 6 (where the elements similar to those of FIG. 2 have the same reference numbers) the directions of vibration in "even" modes are indicated by arrows. The excitation circuit then drives the transducers for generating a radial input mode (full line arrows); the output mode is then tangential (dotted arrows).

Thus the resonant frequency $f_e$=(f radial) of the input mode is not inherently equal to the resonant frequency $f_s$=(f tangential) of the output mode. From computation, it appears that $f_e$ and $f_s$ are equal if the width h of the slots has a specific value which depends on the cross-section a.a and the length 1 of the beams. However, it is difficult to achieve equality, due to manufacturing inaccuracies. It is consequently preferable to select a value of h such that $f_R$ (radial frequency) be slightly higher than $f_T$. Then $f_R$ may be adjusted by cutting chamfers 19 along the external edges of the beams, throughout the length or at the root thereof. If on the other hand $f_T$ is initially greater than $f_R$, the adjustment should be by cutting along inner edges at 21, which is less convenient.

During operation in "even" modes, all transducers of a same circular row contribute both to energization of the input mode and detection of the output mode and consequently the associated circuitry is more complex than with "odd" modes. That drawback is removed when using a "mixed" mode obtained by a linear combination of the two possible "even" modes. In the embodiment illustrated in FIG. 7, the input mode corresponds to the sum of the radial and tangential modes. The output mode corresponds to the difference between the radial and tangential modes. Incidentally, non-zero quadrature signals appear in the measurement circuit if $f_R$ and $f_T$ are different. It makes it possible to detect a frequency differential and rends adjustment easier.

Figure 7:
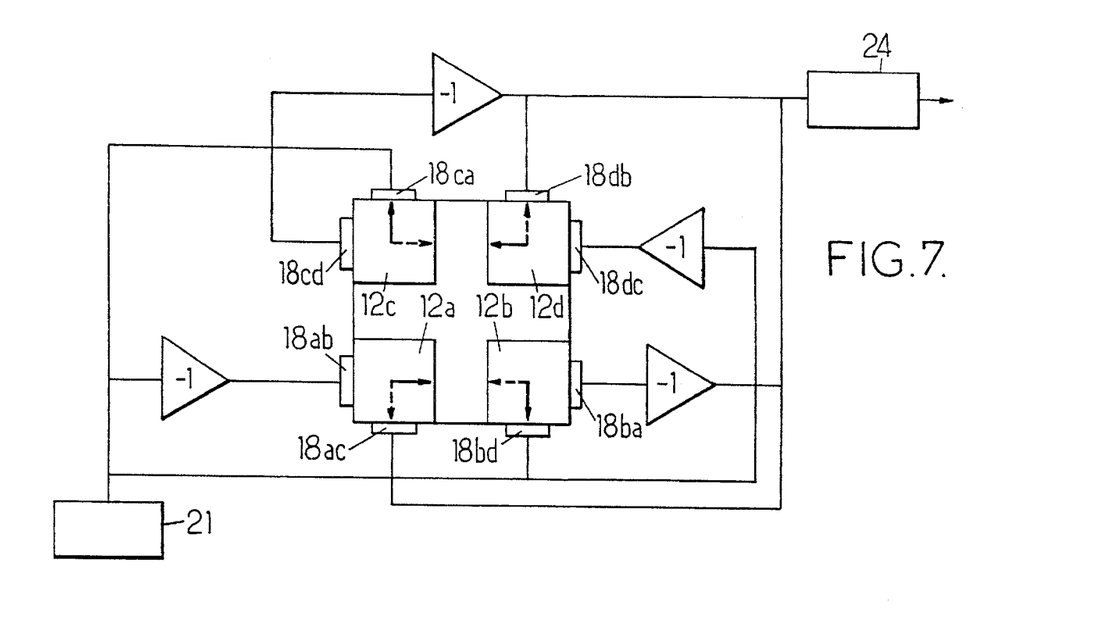
Figure 8:
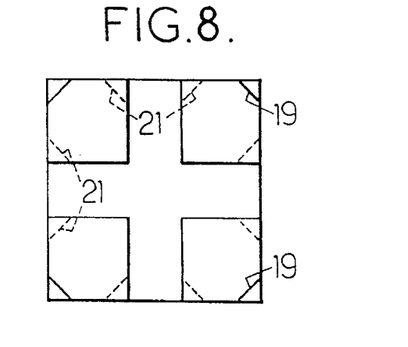
FIG. 8 is a schematic representation, in cross-section at the foot of the beams of the resonator, indicating how the vibration frequency $f_T$ in tangential mode and the vibration frequency $f_R$ in radial mode may be rendered equal.

Referring to FIG. 7, a possible construction of open-loop driving and measurement circuit, for a mixed mode, is illustrated for operation with conventional piezo-electric elements. The components corresponding to those of FIG. 4 are designated by the same reference numbers. The energization circuit drives the piezo-electric elements 18ca and 18bd directly and the piezo electric element 18ab and 18dc via inverters. The measurement circuit 24 receives the output signals of elements 18ac and 18db directly and the output signals of elements 18bc and 18cd via inverters.

The inverters may be omitted if elements are used which were polarized by a high voltage during manufacture. Then applying a voltage across the initial electrodes (metal coding on one surface and beam on the other surface) results in either expansion of contraction.

Figures 9, 10, 17:
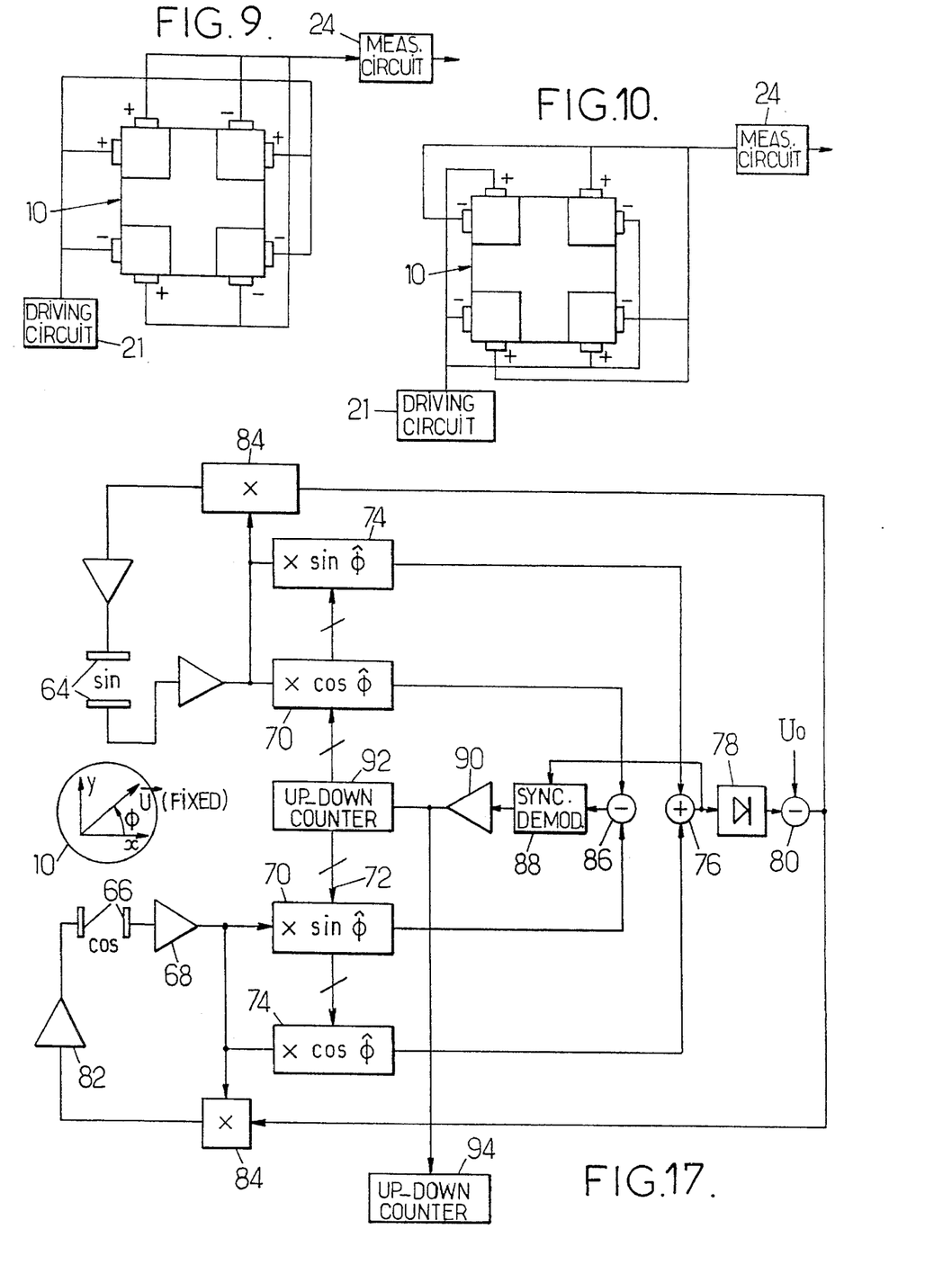
FIG. 9 is a schematic representation, in cross-section, indicating how inverters may be omitted with piezoelectric elements having different polarities, with "odd" modes.
FIG. 10, similar to FIG. 9, uses "mixed" or "hybrid" modes.
FIG. 17 is a simplified block diagramm of a possible construction of the apparatus, suitable for use as a gyroscope.

By using transducers in different orientations, the circuits may be simplified by omitting voltage subtractors and/or inverters which were necessary in FIG. 7. Referring to FIGS. 9 and 10, where the polarities of the transducers are respectively indicated by + and −, open-loop circuits for operation in "odd" mode and "mixed" mode are illustrated.

Each of the circuits may be implemented for closed loop as well as for open loop operation. Typically, the driving circuit will be arranged for operation in closed loop, whereby the amplitude of the input mode is maintained at a predetermined value. The selection between an open loop or a closed loop measurement circuit will depend on the characteristics preferable for the apparatus.

Figure 11:
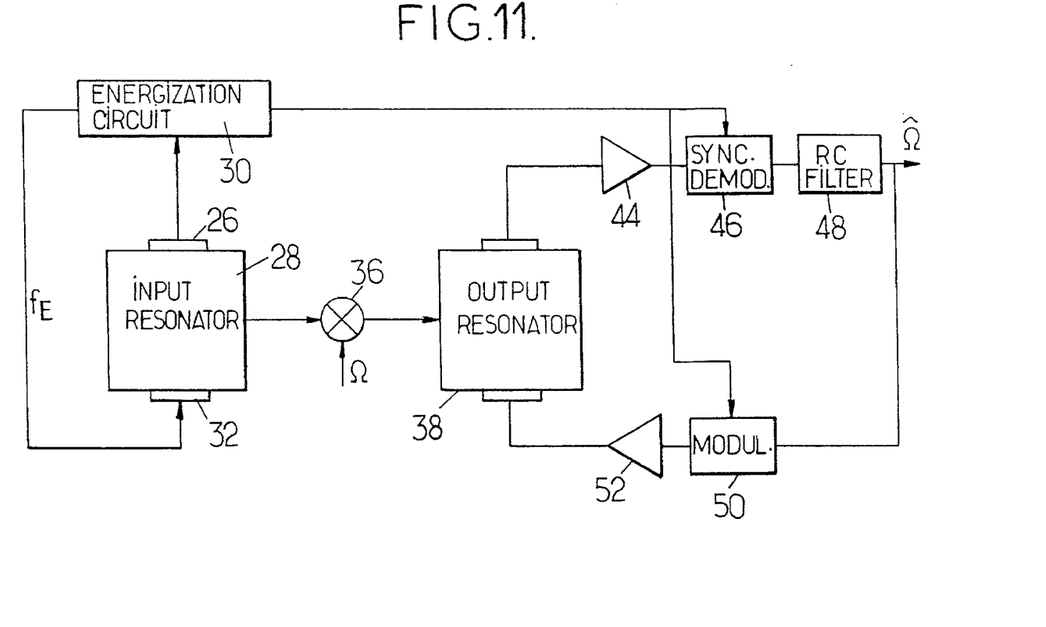
FIG. 11 is a diagrammatic equivalent representation of an apparatus according to the invention with closed loop energization and measurement circuits.

If for instance an accurately controlled and stable scale factor and a broad pass band are required, a closed loop apparatus may preferably be used. Then an increased number of transducers is necessary. Then, as in the embodiment of FIG. 1, eight additional piezo electric elements 20ab, . . . , 20dc are distributed in a circumferential row, directly above elements 18ab, . . . , 18dc. FIG. 11 is a diagramatic representation of input and output circuits operating in closed loop which may be similar to those illustrated in FIG. 5. For more clarity, the resonator has been functionally illustrated on FIG. 11 as an input resonator 28 and an output resonator 38, which consist of the same structural components (base and beams). The transducers functionally represented as a single transducer 26 are arranged for measuring amplitude of the input mode vibration and they deliver an alternating signal having a value in direct relation with the extent of movement of the input resonator 28 to the energization circuit 30. Circuit 30 drives, at the resonant frequency $f_E$, the driving transducers 32. The Coriolis forces are functionally illustrated as an operator 36 which couples resonators 28 and 38.

The measurement circuit may then comprise an amplifier 44 receiving the output signal from detection transducers, followed with a synchronus demodulator 36 which receives a reference signal originating from the energization circuit 30. The demodulated signal is applied to a correcting network 48 (generally a RC filter) whose pass band defines the pass band of the apparatus. The output of the correcting network 48 provides an evaluation $\Omega$ of the rate of turn. The output signal is also brought back to the counterfeedback transducers through a modulator 50 and an amplifier 52.

When a high scale factor is preferable, in direct relation with the quality factor Qm of the resonator, operation of the measurement circuit in open loop is advisable. However, the quality factor Qm is not stable and a modification of the losses, even of small magnitude, may result in a significant modification of coefficient Qm. Another limitation is that the pass band, equal to f/2Qm (where f is the resonant frequency) is narrow and insufficient for some applications.

Figure 12:
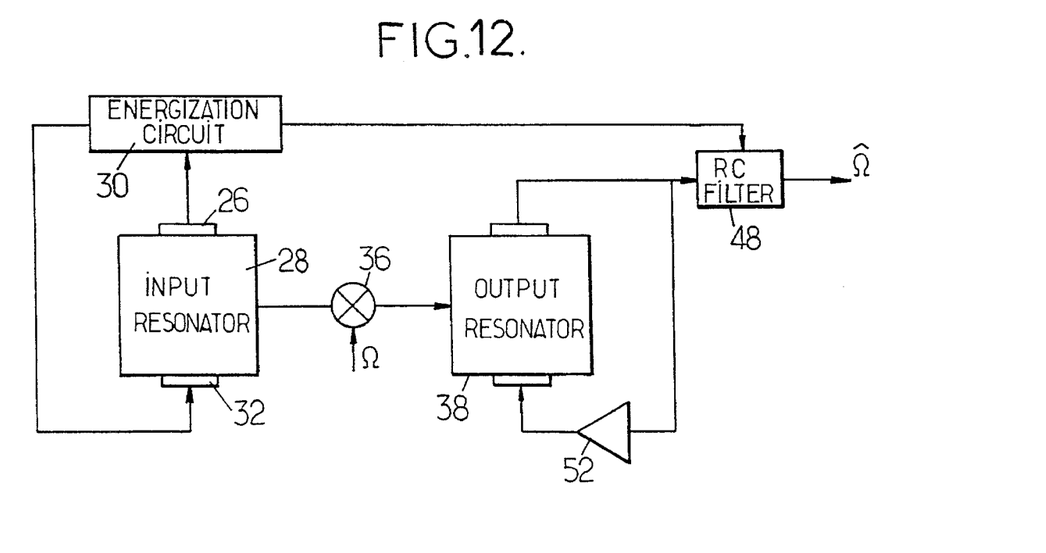
FIG. 12, similar to FIG. 9, is a diagrammatic equivalent representation of an apparatus having an open loop electrically dampened measurement circuit.

Referring to FIG. 12 (where the components corresponding to those of FIG. 11 have the same reference numerals) a device having an open loop measurement circuit overcoming the above limitation is illustrated. It includes electrical dampening means and in addition is more simple than that of FIG. 11. The output resonator 38 is electrically dampened by a loop comprising an operational amplifier 52 having a gain K(p) which introduces a force in direct relation with the detected rotational velocity of the mechanical resonator 38. Then the quality coefficient Qt which determines the output signal $\hat{\Omega}$ is given by:

$1/Q_t=(1/Q_m)+(1/Q_e)$.

If the electrical quality coefficient $Q_e$ is much lower than $Q_m$, the resulting quality coefficient Qt is substantially independent of $Q_m$ and may be quite stable. The op amp 52 will be selected for having a pass band centered on the most frequent operating frequency and the transfer function K(p) will be selected for not energizing other natural modes of oscillation of the resonator.

As indicated earlier, piezo electric elements are frequently used as transducers. They are completely reversible, commercially available in all usual sizes and easily implemented by bonding then on the planar surfaces of the beams. As a counterpart, they significantly reduce the mechanical quality factor of the resonator. By way of example, a resonator of aluminum alloy having a quality factor of about 25,000 with clean beams has a quality factor of about 2,500 when it carries piezo electric elements. For most applications, such a quality coefficient and a time shift of about $1/10°$ per second are acceptable; then piezo electric elements constitute a satisfactory choice.

Figure 13:
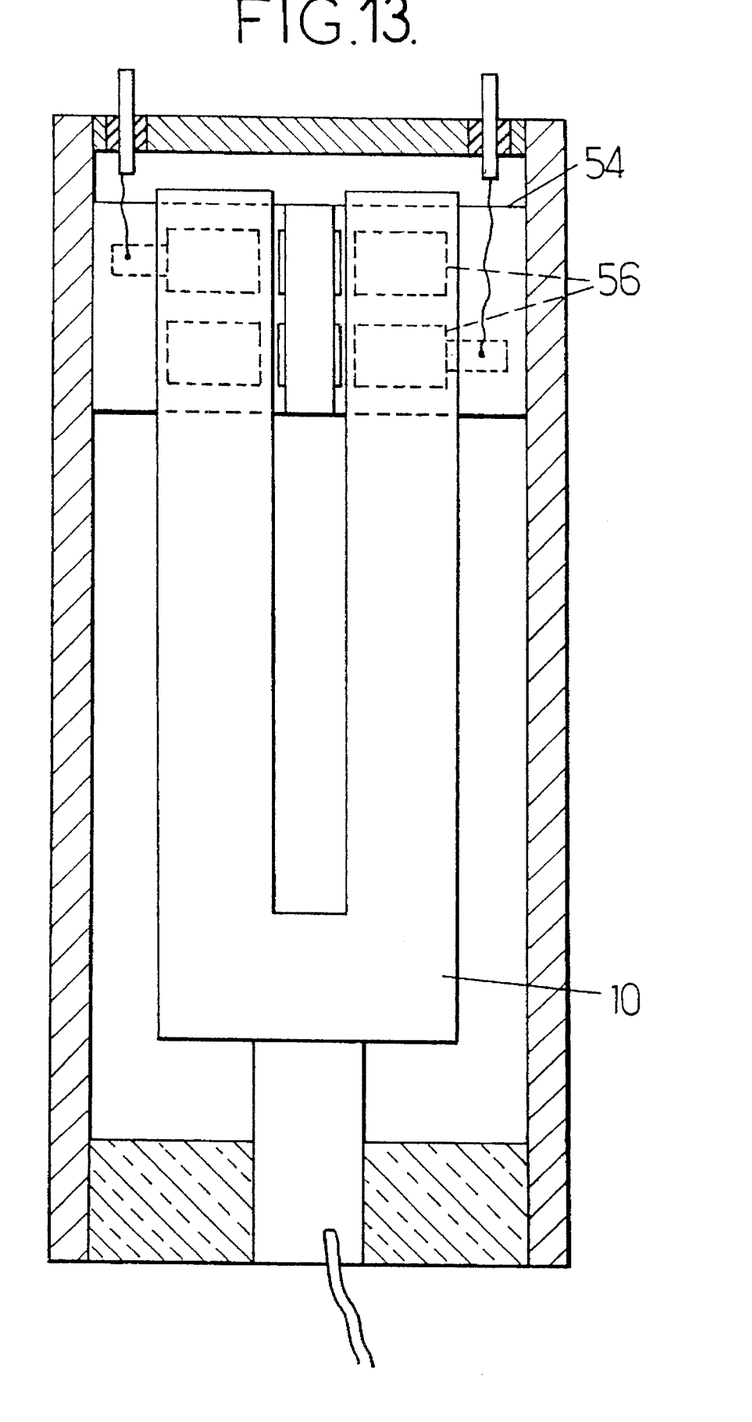
FIG. 13 is a perspective view of a possible arrangement of electrostatic transducers on a resonator.

On the other hand, it may be preferable to use transducers which do not detrimentally affect the mechanical quality factor of the resonator for high quality apparatus. For that purpose, electrostatic transducers may be used. FIG. 13 is a isometric representation on which such transducers are illustrated above a resonator rather than between the beams, for more clarity. The transducers may then comprise cross-plates 54 of electrically insulating material, whose surfaces carry metal electrodes 56 which constitute capacitors with the beams which are at a constant voltage. The cross-plate 54 may possibly be fixed to the housing 18 which contains the resonator (FIG. 1) and the electrical connections between the electrodes and the outer circuit may then traverse the bottom wall of the housing. Again, it is possible to provide one row of transducers, as shown in FIG. 13, or two superimposed rows, as with piezo electric elements.

The input and output circuits used with electrostatic transducers may be similar to those used with piezo electric elements. However, it appears preferable to use circuit arrangements which take into account the specific features of the electrostatic transducers and such circuits may or not generate a high frequency carrier. Particular features of the electrostatic transducers are that they cannot exert repulsive forces and that their response is not linear.

Figure 14:
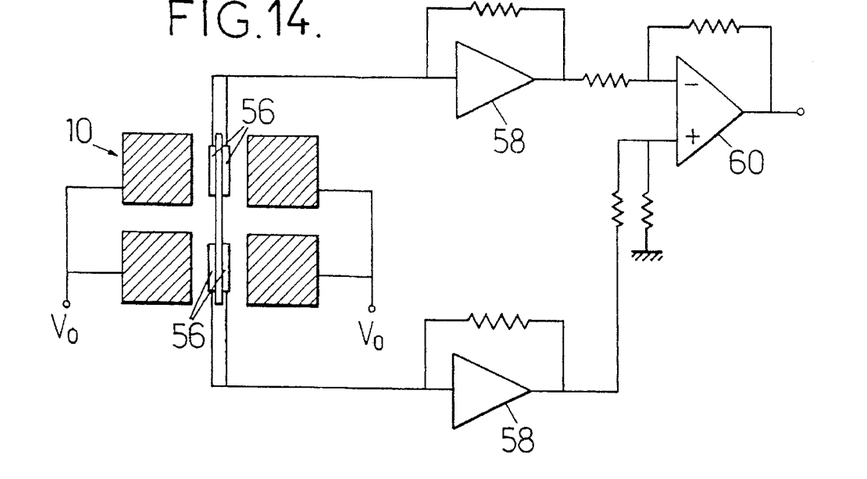
FIG. 14 illustrates a possible construction of measurement circuit suitable for use with a resonator having electro-static transducers.

As illustrated schematically on FIG. 14, which corresponds to an "odd" oscillation mode, the measurement circuit comprises two branches each having a charge amplifier 58 which drives the input of an algebric adder 60. The resonator is at a DC bias voltage $V_0$.

The vibration induced by the Coriolis acceleration results in a modulation of the gaps of the four capacitors and in an alternating voltage at the vibration frequency. Such voltage has an amplitude which is proportional to the amplitude of the vibration and is also used for the energization required for the input mode.

The scale factor of the measurement circuit is proportional to the DC bias voltage $V_0$. That constant bias voltage is also considered in the operation of the input circuit which may have different constructions.

Figures 15, 16:
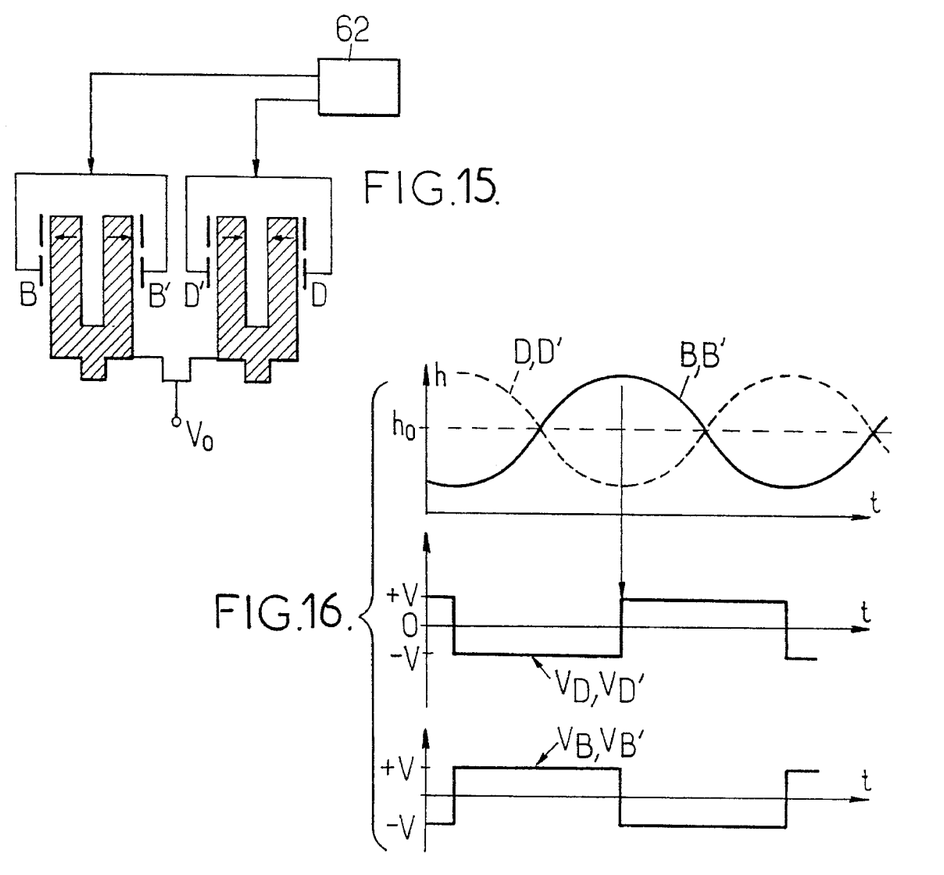
FIG. 15 is a schematic representation of still another arrangement of electro-static transducers.
FIG. 16 is a representation of the time variation of the gap, applied voltages and attraction forces in a resonator of the type shown in FIG. 15.

Referring to FIG. 15, a particular embodiment which makes it possible to obtain a linear response of the apparatus is illustrated. Again for more clarity, the two tuning-fork each constituted by two beams have been represented side by side.

The circuit 62 for applying energy sufficient for compensating losses (in input mode or output mode) is arranged for alternatively applying voltages +V and −V (V being lower than $V_0$) to the electrodes or the electrostatic transducers. Consequently the attractive force exerted between an electrode and a beam alternatively takes values which are proportional to $(V_0+V)^2$ and $(V_0-V)^2$ which results in a force modulation proportional to $4V_0V$ about $V_0^2+V^2$.

The modulation should be applied in phase coincidence with the speed, not with the movement of the beams. The law of variation of the gap h against time is represented on the highest line on FIG. 16, where $h_0$ designates the gap at rest. The gap varies in phase opposition for the two couples of electrodes, B and B' on one hand, D and D' on the other hand. Circuit 62 is controlled by a movement sensor (not shown) whereby the attractive force be maximum when the velocity of the beam is directed in the direction of the tractive force.

The gyrometer device may be used as a gyroscope with a modification of the circuits associated with the resonator, i.e. for measuring an angle, subject to the condition that the beams have a sufficient length for the vibration plane to remain substantially stationary in space even for the highest rotational velocities which are envisioned. For use of the device as a gyroscope, the input energization circuit and the output circuit may have constructions similar to those described above, for compensating for the losses of the input and output resonators.

If the planes of vibration remain stationary in the inertial space, a rotation $\Theta$ of the resonator and of its housing about the axis is measured, from a stationary reference, as an angle $\Phi$ whose cosine and sine are in proportion with the amplitudes of vibration of the input and output resonators, which vibrate in mutually orthogonal directions.

Such a device, when used as a gyroscope, has the advantage of an unlimited angular range, contrary to the present gyroscopes.

Referring to FIG. 17, a possible construction of the circuits associated to a resonator of the type shown in FIG. 1 is given for operation as a gyroscope. For more clarity, the transducers 64 for measuring the amount of vibration in direction Y and for compensating the losses and the transducers 66 for measuring the amount of vibration in direction X and for compensating the corresponding losses have been represented side by side.

The block diagram of FIG. 13 may be regarded as comprising:

an encoding circuit whose construction is similar to that of a follower-resolver, providing an estimated value of angle $\Theta$ from a reference position, two loss compensation branches, respectively dedicated to the sine $\Phi$ and cosine $\Phi$ components.

The two channels have the same construction. As represented in FIG. 17, an input signal of the cosine channel, derived from one of the transducers 66, is applied through an amplifier 68 to an analog-digital multiplier 72. That multiplier further receives a signal which represents the estimated angle $\hat{\Phi}$ and it provides the product of the input signal and cosine $\hat{\Phi}$ in analog form, on its output.

A second multiplier 74 is connected to deliver a signal which represents the product of the signal from transducer 66 and cosine $\hat{\Phi}$ on its output.

In the other channel, the sine and cosine functions are interchanged.

The signals from the multipliers 74 of both channels are added in the summing circuit 76 and the AC output signal of summing circuit 76 is rectified at 78. The DC signal which is obtained is a representation of the amplitude of the resulting vibration (combination of vibrations along X and Y). That DC signal is applied to a subtractor 80 which receives a signal representing $U_0$, i.e. the set value of the amplitude of vibration to be maintained.

The power necessary for maintaining vibration is applied on each channel by a cascade of an analog multiplier 84 for adjusting the oscillating gain and an amplifier 82 having a fixed gain. The multiplier is connected to receive the output signal of subtractor 80 on its first input and to receive the signal from amplifier 68, which represents the actual amplitude of the oscillation along direction X, on its other input.

The encoding circuits may comprise a substractor 86 which receives the outputs of multipliers 70 and a synchronous demodulator 88. The demodulator may receive a reference signal from the output of summing circuit 76.

In the illustrated embodiment, which makes use of analog-digital multipliers in the loss compensation channels, the demodulator 88 is followed with a voltage-frequency converter 90 whose output is applied to an up-down counter 92 whose contents constitute the useful signal and which is also the input signal of multipliers 70. The output of converter 90 consists of successive pulses, each of which represents a rotational increment. The angle of rotation may as well be delivered by a separate up-down counter 94 which receives the pulses.

We claim:

1. Vibrating beam gyroscopic measuring apparatus, having:

a resonator comprising four identical beams having central axes which are mutually parallel, a common base having a square surface, said four beams being integral with said base at said square surface and projecting in a same direction from said square surface of said base at all four corners formed by said square surface, said beams being constructed to have a same resonant frequency in two directions parallel to two adjacent sides of said square base, first transducers for vibrating each of said beams in a first direction orthogonal to said beams, connected to a driving circuit, and second transducers for detecting an amplitude of vibration of said beams in second directions each orthogonal to a respective said first direction and connected to a measurement circuit.

2. Apparatus according to claim 1, wherein said first and second transducers are piezo-electric elements.

3. Apparatus according to claim 1, wherein only some of the beams are provided with said first transducers.

4. Apparatus according to claim 1, wherein all said four beams carry said second transducers connected to deliver signals to said measurement circuit.

5. Apparatus according to claim 1, wherein said measurement circuit is in closed loop and delivers Coriolis force balancing circuits to compensating said second transducers carried by all said four beams.

6. Apparatus according to claim 1, wherein said first transducers are arranged in a cicumferential row and said second transducers are disposed in another row spaced from the first row along the resonator.

7. Apparatus according to claim 1, wherein said first transducers and said driving circuit are arranged and connected to vibrate all said beams in mutually parallel directions.

8. Apparatus according to claim 1, wherein said first and second transducers are electrostatic transducers comprising stationary elements which constitute capacitors with said beams of conducting metal.

9. Apparatus according to claim 8, further comprising means for applying a bias DC voltage to said resonator and wherein said second transducers are connected by pairs to respective charge amplifiers which are applied to plus and minus inputs of an algebraic summer.

10. Apparatus according to claim 8, wherein said first transducers are connected to constitute two pairs and connected to a DC voltage generator which deliver voltages +V and −V in phase opposition on said two pairs.

11. Apparatus according to claim 8, wherein said electrostatic transducers comprise electrodes confronting said beams, said electrostatic transducers being carried by electrically insulating cross-plates located between said beams.

12. Vibrating beam gyroscopic measuring apparatus, having:

a resonator comprising four mutually parallel identical beams integral with a common square base and projecting from said base at all corners of a virtual rectangle, said beams being constructed to have a same resonant frequency in two directions parallel to the two sides of said square base, first transducers for vibrating each of said beams in a first direction orthogonal to said beams, connected to a driving circuit, and second transducers for detecting an amplitude of vibration or said beams in second directions each orthogonal to a respective said first direction and connected to a measurement circuit, wherein said first transducers and said driving circuit are arranged for vibrating two of said beams in a first direction parallel to two sides of said rectangle and the other two of said beams in a direction parallel to the other two sides of said rectangle.

13. Vibrating beam gyroscopic measuring apparatus, having:

a resonator comprising four mutually parallel identical beams integral with a common square base and projecting from said base at all corners of a virtual rectangle, said beams being constructed to have a same resonant frequency in two directions parallel to the two directions of two mutually adjacent sides of said square base, first transducers for vibrating each of said beams in a first direction orthogonal to said beams, connected to a driving circuit, and second transducers for detecting an amplitude of vibration of said beams in second directions each orthogonal to a respective said first direction and connected to a measurement circuit, wherein said driving circuit is a closed loop circuit for maintaining an amplitude of vibration in an input mode at a constant value, is connected to receive input signals from some of said first transducers associated with two said beams and delivers a driving signal to others of said first transducers associated by the other two beams.

14. Apparatus according to claim 13, wherein said first transducers and said driving circuit are arranged and connected to vibrate all said beams in mutually parallel directions.

15. Apparatus according to claim 13, wherein said first transducers and said driving circuit are arranged for vibrating said beams one of radially or tangentially.

16. Apparatus according to claim 13, wherein the driving circuit (20) comprises an amplifier (32) which drives a multiplier (34) through a pass band filter controlled by a phase regulation loop and wherein said multiplier (34) has a gain controlled by the amplitude regulation closed loop (38) which receives the output signal of amplifier (32) and a reference signal.

17. Apparatus according to claim 13, wherein said transducers are electrostatic transducers comprising stationary elements which constitute capacitors with said beams of conducting metal.

18. Apparatus according to claim 17, further comprising means for applying a bias DC voltage to said resonator and wherein said second transducers are connected by pairs to respective charge amplifiers which are applied to plus and minus inputs of an algebric summer.

19. Apparatus according to claim 17, wherein said first transducers are connected to constitute two pairs and connected to an DC voltage generator which deliver voltages +V and −V in phase opposition on said two pairs.

20. Apparatus according to claim 17, wherein said electrostatic transducers comprise electrodes confronting said beams said electrostatic transducer being carried by electrically insulating cross-plates located between said beams.

21. Vibrating beam gyroscopic measuring apparatus for measuring an amount of rotation, having:

a resonator comprising four mutually parallel identical beams integral with a common square base and projecting from said base at all corners of a virtual square, each of said beams being constructed to have a same resonant frequency in two directions parallel to the two directions of two adjacent sides of said square base, first transducers for vibrating and detecting an amount of vibration of each of said beams in a first direction orthogonal to said beams, second transducers for vibrating and detecting an amount of vibration of each of said beams in a second direction orthogonal to a respective said first direction, and a driving and measurement circuit having:

two loss compensation channels each of said channels for compensating losses along one of said first direction and said second direction, each of said channels comprising a first multiplier for multiplying an input signal received from one of said first and second transducers by a sine or cosine of an estimated angle of said resonator around a direction parallel to the beams and a second multiplier for multiplying said input signal with a sum of the output signals delivered by the first multipliers of the two channels, said second multiplier having an output communicating to a respective one of said first transducers and second transducers for compensating losses along one of said directions, and an angular encoding circuit providing said estimated angle, having subtracting means with two inputs, one of the inputs being connected to receive the product of a first one of said inputs and the sine of the estimated angle and the other of which is connected to receive the product of the cosine of said estimated angle and the other input and an output delivering an analog signal representative of said estimated angle.

22. Vibrating beam gyroscopic measuring apparatus, having:

a resonator comprising four mutually parallel identical beams integral with a common square base and projecting from said base at all corners of a virtual rectangle, said beams being constructed to have a same resonant frequency in two directions parallel to the two directions of the sides of said square base, first transducers for vibrating each of said beams in a first direction orthogonal to said beams, connected to a driving circuit, second transducers for detecting an amplitude of vibration of said beams in second directions each orthogonal to a respective said first direction, and a measurement circuit connected to receive signals from said second transducers, comprising an input amplifier followed with a synchronous demodulator which receives a reference signal consisting of an output signal of said driving circuit and which delivers an output signal representing the rate of turn of the resonator and further comprising a servo loop consisting of a connection between an output of the input amplifier and said first transducers used for compensation of losses.

* * * * *